United States Patent
Lee et al.

(10) Patent No.: US 9,882,701 B2
(45) Date of Patent: Jan. 30, 2018

(54) METHOD AND APPARATUS FOR ALLOCATING CHANNEL IN WIRELESS LOCAL AREA NETWORK

(71) Applicant: Electronics and Telecommunications Research Institute, Daejeon (KR)

(72) Inventors: Jae Seung Lee, Daejeon (KR); Hyoung Jin Kwon, Daejeon (KR); Min Ho Cheong, Daejeon (KR); Sok Kyu Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 373 days.

(21) Appl. No.: 14/561,007

(22) Filed: Dec. 4, 2014

(65) Prior Publication Data

US 2015/0163043 A1 Jun. 11, 2015

(30) Foreign Application Priority Data

Dec. 4, 2013 (KR) .................. 10-2013-0150165
Dec. 3, 2014 (KR) .................. 10-2014-0172441

(51) Int. Cl.
| | | |
|---|---|---|
| H04L 5/00 | (2006.01) | |
| H04W 72/12 | (2009.01) | |
| H04W 72/04 | (2009.01) | |
| H04W 84/12 | (2009.01) | |
| H04W 88/08 | (2009.01) | |
| H04W 92/20 | (2009.01) | |

(52) U.S. Cl.
CPC .......... *H04L 5/0073* (2013.01); *H04L 5/0023* (2013.01); *H04L 5/0053* (2013.01); *H04W 72/12* (2013.01); *H04L 5/0094* (2013.01); *H04W 72/0446* (2013.01); *H04W 84/12* (2013.01); *H04W 88/08* (2013.01); *H04W 92/20* (2013.01)

(58) Field of Classification Search
None
See application file for complete search history.

(56) References Cited

U.S. PATENT DOCUMENTS

| | | |
|---|---|---|
| 2006/0251013 A1 | 11/2006 | Roy et al. |
| 2010/0202391 A1 | 8/2010 | Palanki et al. |
| 2012/0114056 A1 | 5/2012 | Jafarkhani et al. |
| 2013/0142068 A1 | 6/2013 | Marinier et al. |

(Continued)

FOREIGN PATENT DOCUMENTS

KR  10-2013-0071397 A  6/2013

OTHER PUBLICATIONS

Krishna Gomadam et al., "Approaching the Capacity of Wireless Networks through Distributed Interference Alignment", arXiv.0803.3816v1 [cs.IT], Mar. 26, 2008, pp. 1-10.

*Primary Examiner* — Sulaiman Nooristany

(57) ABSTRACT

A method and apparatus for allocating a channel in a wireless local area network (WLAN) is disclosed. The method includes receiving a first frame including scheduling information with respect to a first interval from a second access point, generating a second frame including resource related information required for transmission and reception during a second interval which is continuous to the first interval, and transmitting the second frame to the second access point. Accordingly, performance of the WLAN can be improved.

18 Claims, 9 Drawing Sheets

(56) References Cited

U.S. PATENT DOCUMENTS

2016/0183162 A1* 6/2016 Jeong .................... H04W 40/22
370/311
2016/0381702 A1* 12/2016 Jeong .................. H04W 74/006
370/329

* cited by examiner

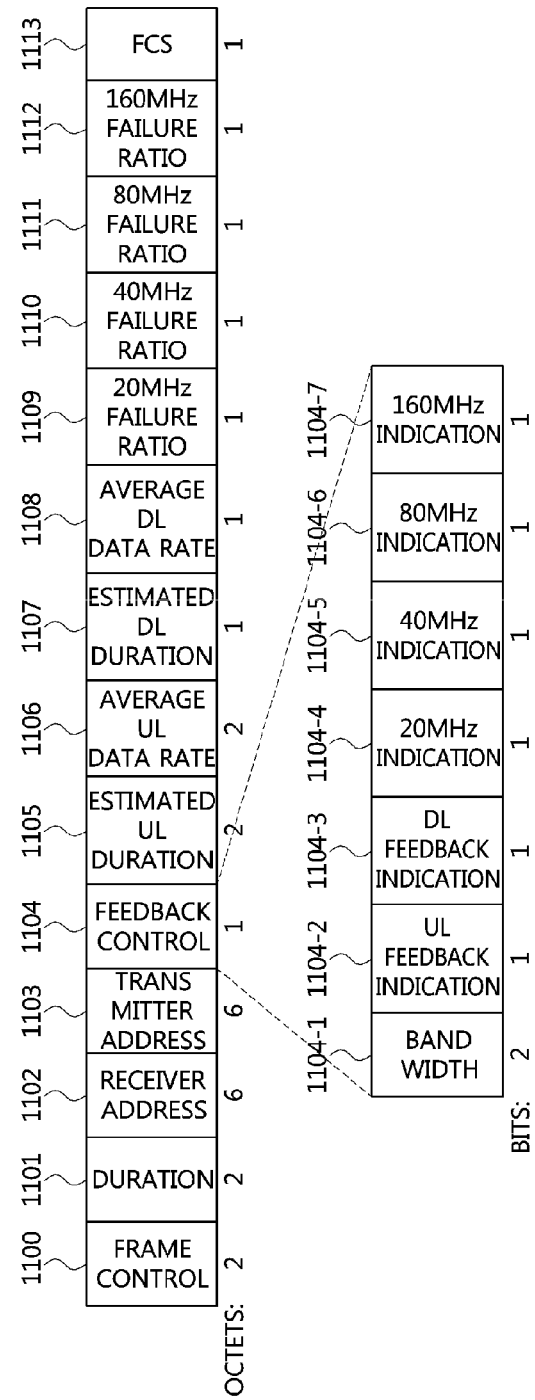

METHOD AND APPARATUS FOR ALLOCATING CHANNEL IN WIRELESS LOCAL AREA NETWORK

CLAIM FOR PRIORITY

This application claims priority to Korean Patent Application No. 2013-0150165 filed on Dec. 4, 2013 and No. 2014-0172441 filed on Dec. 3, 2014 in the Korean Intellectual Property Office (KIPO), the entire contents of which are hereby incorporated by reference.

BACKGROUND

1. Technical Field

Example embodiments of the inventive concept relate in general to wireless local area network (WLAN) technology, and more specifically, to technology of allocating a channel in an overlapping basic service set (OBSS).

2. Related Art

Various wireless communication technologies are being developed along with the development of information communication technology. Among them, wireless local area network (WLAN) technology is technology to allow a mobile terminal such as a personal digital assistant (PDA), a laptop computer, a portable multimedia player, a smart phone, a tablet personal computer (PC), etc. to connect to the Internet wirelessly in homes and businesses, or a specific service provision area based on radio frequency technology.

A standard of the WLAN technology is being developed as an Institute of Electrical and Electronics Engineers (IEEE) 802.11 standard. The WLAN technology according to an IEEE 802.11a standard operates based on an orthogonal frequency division multiplexing (OFDM) method, and provides a transmission speed of maximum 54 Mbps in a 5 band GHz. The WLAN technology according to an IEEE 802.11b standard operates based on a direct sequence spread spectrum (DSSS) method, and provides a transmission speed of maximum 11 Mbps in a 2.4 GHz band. The WLAN technology according to an IEEE 802.11g standard operates based on the OFDM method or the DSSS method, and provides a transmission speed of maximum 54 Mbps in the 2.4 GHz band.

The WLAN technology according to an IEEE 802.11n standard operates in the 2.4 GHz and 5 GHz bands based on the OFDM method, and when using a multiple input multiple output-OFDM (MIMO-OFDM) method, provides a transmission speed of maximum 300 Mbps with respect to four spatial streams. The WLAN technology according to the IEEE 802.11a standard supports a maximum channel bandwidth of 40 MHz, and in this case, provides a transmission speed of maximum 600 Mbps.

As the spread of the WLAN is ongoing and various applications using the same are developed, there is an increasing need for a new WLAN to support a greater throughput than a data processing speed which the IEEE 802.11n standard supports. Very high throughput (VHT) WLAN technology is one of the IEEE 802.11 technologies which are being offered in order to support a data processing speed which is equal to or more than 1 Gbps. Among them, an IEEE 802.11ac is being developed as a standard for providing the VHT at a band which is equal to or less than 5 GHz, and an IEEE 802.11ad is being developed as a standard for providing the VHT at a 60 GHz band.

As use of the WLAN has recently increased, a possibility of using an overlapping channel between adjacent access points (or, adjacent basic service sets (BSSs)) has been increased. Since the overlapping channel between the adjacent access points is used, there is a problem in that performance of the WLAN degrades.

SUMMARY

Accordingly, example embodiments of the inventive concept are provided to substantially obviate one or more problems due to limitations and disadvantages of the related art.

Example embodiments of the inventive concept provide a method of allocating a channel by considering an overlapping channel between adjacent basic service sets (BSSs).

Example embodiments of the inventive concept also provide an apparatus of allocating a channel by considering an overlapping channel between adjacent BSSs.

In some example embodiments, a method of setting a channel performed at a first access point, the method of setting the channel includes: receiving a first frame including scheduling information with respect to a first interval from a second access point; generating a second frame including resource related information required for transmission and reception during a second interval which is continuous to the first interval; and transmitting the second frame to the second access point.

The first frame may be a beacon frame.

The first frame may include duration information from a transmission starting time of the first frame to a transmission end time of the second frame.

The method of setting the channel of claim 1, wherein the first frame includes restricted access window information indicating a transmission period of the second frame.

The first frame may be received at a starting time of the first interval.

The scheduling information may include at least one of an operating channel and a transmission period of the first access point during the first interval.

The resource related information may include at least one of estimated duration information required for transmission and reception of a frame during the second interval, and a data rate and a transmission failure ratio of each of bandwidths during an interval prior to the first interval.

The transmitting of the second frame to the second access point may include transmitting the second frame to the second access point when a poll frame is received from the second access point.

The method of setting the channel may further include: transmitting and receiving a frame with at least one terminal connected to the first access point at an operating channel and within a transmission period indicated by the scheduling information.

In other example embodiments, a method of managing a channel performed at a second access point includes: generating a first frame including scheduling information with respect to a first interval; transmitting the first frame to a first access point; and receiving a second frame including resource related information required for transmission and reception through a second interval which is continuous to the first interval from the first access point.

The first frame may be a resource allocation frame.

The first frame may be transmitted to the first access point after the beacon frame of the second access point is transmitted.

The scheduling information may include at least one of an operating channel and a transmission period of the first access point during the first interval.

The resource related information may include at least one of estimated duration information required for transmission and reception of a frame through the second interval, and a data rate and a transmission failure ratio of each of bandwidths during an interval prior to the first interval.

The method of managing the channel may further include: generating scheduling information with respect to the second interval based on the resource related information.

In still other example embodiments, a first access point, includes: a processor; and a memory configured to store at least one command which is executed through the processor, wherein the at least one command enables the processor to execute an operation including: receiving a first frame including scheduling information with respect to a first interval from a second access point; generating a second frame including resource related information required for transmission and reception through a second interval which is continuous to the first interval; and transmitting the second frame to the second access point.

The scheduling information may include at least one of an operation channel and a transmission period of the first access point during the first interval.

The resource related information may include at least one of estimated duration information required for transmission and reception of a frame through the second interval, and a data rate and a transmission failure ratio of each of bandwidths during an interval prior to the first interval.

The transmitting of the second frame to the second access point may include transmitting the second frame to the second access point when a resource allocation frame is received from the second access point.

The at least one command may enable the processor to execute the operation further including transmitting and receiving a frame with at least one terminal connected to the first access point in an operating channel and a transmission period indicated by the scheduling information.

BRIEF DESCRIPTION OF DRAWINGS

Example embodiments of the inventive concept will become more apparent by describing in detail example embodiments of the inventive concept with reference to the accompanying drawings, in which:

FIG. 10 is a table for describing a resource allocation element according to an embodiment of the inventive concept; and FIG. 11 is a diagram illustrating a structure of a resource allocation feedback frame according to an embodiment of the inventive concept.

DESCRIPTION OF EXAMPLE EMBODIMENTS

Figure 1:
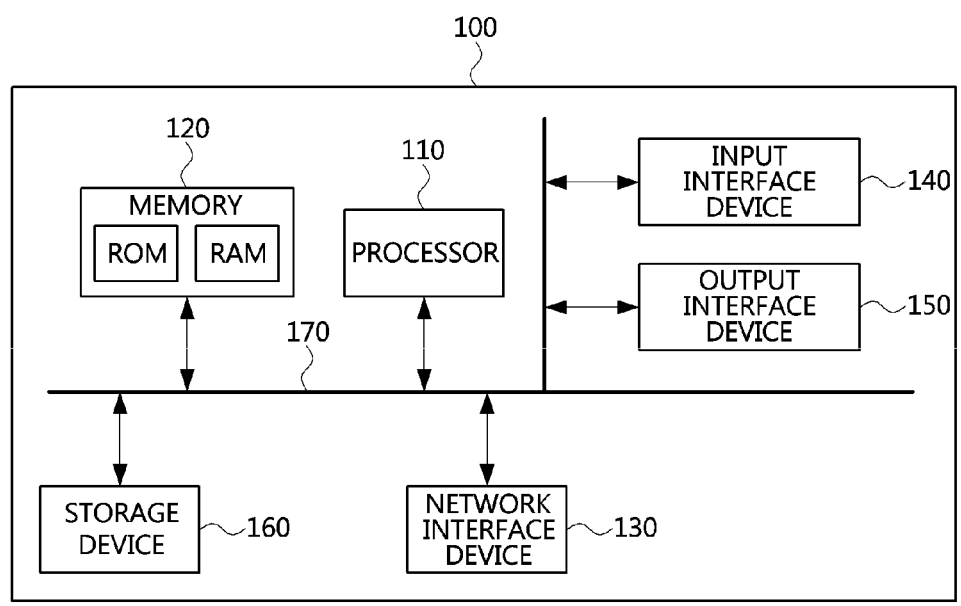
FIG. 1 is a block diagram illustrating a configuration of a station performing methods according to an embodiment of the inventive concept.

While the invention is susceptible to various modifications and alternative forms, specific embodiments thereof are shown by way of examples in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the inventive concept will be described in detail with reference to the accompanying drawings. In order to facilitate a throughout understanding in the following description, like numbers refer to like elements in the drawings, and duplicated descriptions will be omitted with respect to the like elements.

Throughout the specification, a station (STA) may denote an arbitrary function medium including a medium access control (MAC) which follows regulations of an Institute of Electrical and Electronics Engineers (IEEE) 802.11 standard and an interface which is a physical layer with respect to a wireless medium. The station may be classified as a station (STA) which is an access point (AP) and a station (STA) which is a non-access point (non-AP). The station (STA) which is the access point (AP) may be simply referred to as an access point (AP), and the station (STA) which is the non-access point (non-AP) may be simply referred to as a terminal.

The station (STA) may include a processor and a transceiver, and may further include a user interface and a display device, etc. The processor may denote a unit designed to generate a frame to be transmitted through a wireless network or process a frame received through the wireless network, and may perform various functions for controlling the station (STA). The transceiver may be functionally connected with a processor, and denotes a unit designed in order to transmit and receive a frame through the wireless network for the station (STA).

The AP may be referred to as an centralized controller, a base station (BS), a radio access station, a node B, an evolved node B, a relay, a mobile multihop relay-BS, a base transceiver system, or a site controller, etc., and may include a part or all of functions thereof.

The terminal (that is, the non-AP) may be referred to as a wireless transmitting/receiving unit (WTRU), user equipment (UE), a user terminal (UT), an access terminal (AT), a mobile station (MS), a mobile terminal, a subscriber unit, a subscriber station (SS), a wireless device, or a mobile subscriber unit, etc., and may include a part or all of functions thereof.

Here, the terminal may be a desktop computer, a laptop computer, a tablet PC, a wireless phone, a mobile phone, a smart phone, a smart watch, a smart glass, an e-book reader, a portable multimedia player (PMP), a portable game player, a navigation device, a digital camera, a digital multimedia broadcasting (DMB) player, a digital audio recorder, a digital audio player, a digital picture recorder, a digital picture player, a digital video recorder, a digital video player, etc. which can perform communication.

FIG. 1 is a block diagram illustrating a configuration of a station performing methods according to an embodiment of the inventive concept.

Referring to FIG. 1, a station 100 may include at least one processor 110, a memory 120, and a network interface device 130 which is connected to a network and performs communication. Further, the station 100 may further include an input interface device 140, an output interface device 150, and a storage device 160, etc. Each component included in the station 100 may be connected through a bus 170, and mutually perform communication.

The processor 110 may execute a program command stored in the memory 120 and/or the storage device 160. The processor 110 may mean a central processing unit (CPU), a graphic processing unit (GPU), or an exclusive processor in which methods according to the inventive concept are performed. The memory 120 and the storage device 160 may be configured as a volatile storage medium and/or a non-volatile storage medium. For example, the memory 120 may be configured as a read only memory (ROM) and/or a random access memory (RAM).

Exemplary embodiments of the inventive concept may be applied to a WLAN system according to an IEEE 802.11 standard, and may also be applied to another communication system as well as the WLAN system according to the IEEE 802.11 standard.

For example, exemplary embodiments of the inventive concept may be applied to a mobile Internet such as a wireless personal area network (WPAN), a wireless body area network (WBAN), a wireless broadband Internet (WiBro), or world interoperability for microwave access (WiMax), a second generation (2G) mobile communication network such as global system for mobile communications (GSM) or code division multiple access (CDMA), a third generation (3G) mobile communication network such as wideband code division multiple access (WCDMA) or CDMA2000, a 3.5 generation (3.5G) mobile communication network such as high speed downlink packet access (HSDPA) or high speed uplink packet access (HSUPA), a fourth generation (4G) mobile communication network such as long term evolution (LTE) or LTE-Advanced, and a fifth generation (5G) mobile communication network, etc.

Figure 2:
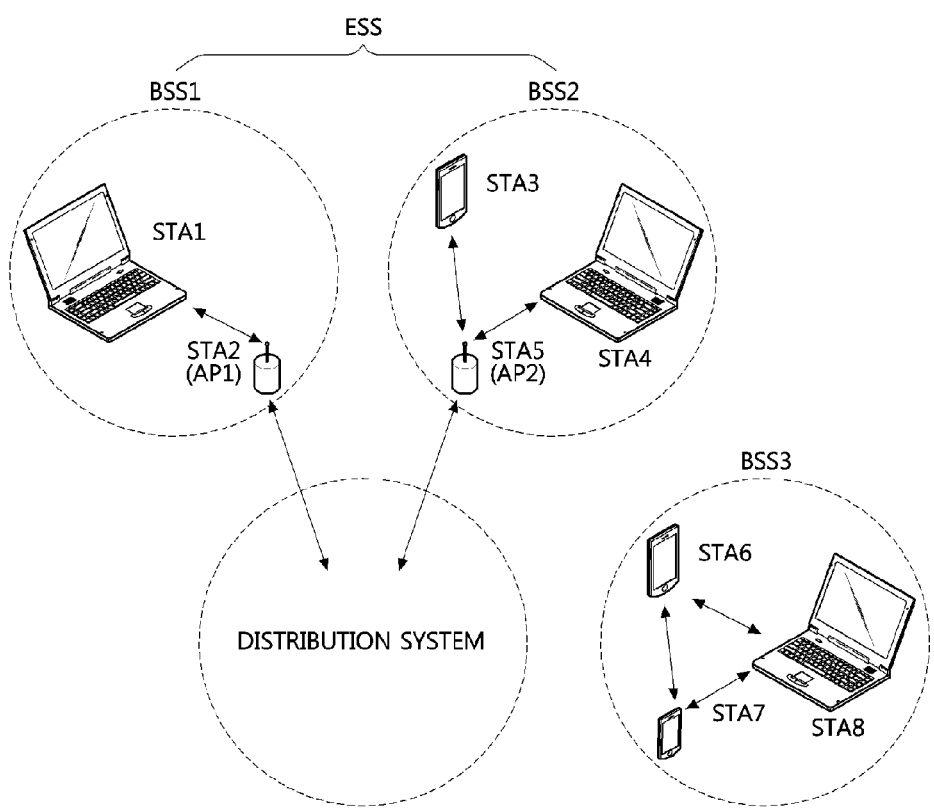
FIG. 2 is a conceptual diagram illustrating a configuration of a wireless local area network system that conforms to an IEEE 802.11 according to an embodiment of the inventive concept.

FIG. 2 is a schematic diagram illustrating a configuration of a wireless local area network system that conforms to an IEEE 802.11 according to an embodiment of the inventive concept.

Referring to FIG. 2, a WLAN system according to an IEEE 802.11 may include at least one basic service set (BSS). The BSS may denote a set of stations STA1, STA2 (AP1), STA3, STA4, STA5 (AP2), STAG, STAT, and STA8 capable of communicating with each other by performing successful synchronization, and may not denote a specific area.

The BSS may be classified as an infrastructure BSS and an independent BSS (IBSS). Here, BSS1 and BSS2 may be the infrastructure BSSs, and BSS3 may be the IBSS.

The BSS1 may include a first terminal STA1, a first access point STA2 (AP1) providing a distribution service, and a distribution system DS connecting a plurality of access points STA2 (AP1) and STA5 (AP2). In the BSS1, the first access point STA2 (AP1) may manage the first terminal STA1.

The BSS2 may include a third terminal STA3, a fourth terminal STA4, a second access point STA5 (AP2) providing a distribution service, and a distribution system connecting the plurality of access points STA2 (AP1) and STA5 (AP2). In the BSS2, the second access point STA5 (AP2) may manage the third terminal STA3 and the fourth terminal STA4.

The BSS3 may denote the IBSS operating in an ad-hoc mode. There is no access point which is a centralized management entity in the BSS3. That is, in the BSS3, the terminals STA6, STA7, and STA8 may be managed in a distributed manner. In the BSS3, each terminal STA6, STA7, and STA8 may denote a mobile terminal, and since the terminals STA6, STA7, and STA8 are not allowed to connect to the distribution system DS, a self-contained network may be constructed.

The access points STA2 (AP1) and STA5 (AP2) may provide access to the distribution system DS through a wireless medium for the terminals STA1, and STA3 and STA4, connected to the access points themselves. Communication between the terminals STA1, STA3, and STA4 in the BSS1 or BSS2 may be generally performed through the access points STA2 (AP1) and STA5 (AP2), but direct communication may be performed between the terminals STA1, STA3, and STA4 when a direct link is set.

A plurality of infrastructure BSSs may be connected to each other through the distribution system DS. The plurality of infrastructure BSSs connected through the distribution system DS may be referred to as an extended service set (ESS). The entities STA1, STA2 (AP1), STA3, STA4, and STA5 (AP2) included in the ESS may communicate with each other, and arbitrary terminals STA1, STA3, and STA4 may move from one BSS to another BSS while seamlessly communicating in the same ESS.

The distribution system DS may be a mechanism for one access point to communicate with another access point, and the access point may transmit a frame for terminals connected in the BSS managed by the AP, or transmit a frame for an arbitrary terminal moved to another BSS. Further, the access point may transmit and receive a frame with an external network such as a wired network, etc. The distribution system DS may not be necessarily a network, and there is no limit to the configuration of the distribution system DS when providing a predetermined distribution service prescribed by the IEEE 802.11 standard. For example, the distribution system DS may be a wireless network such as a mesh network, or a physical structure to connect the access points with each other.

As use of the WLAN has rapidly increased, a problem due to an overlapping BSS (OBSS) has become serious. In an area in which the access points are dense, performance of the WLAN may degrade due to collisions between the BSSs caused by the overlap of the BSSs, channel access competition between the stations, etc. The collisions may be generated more frequently between the BSSs using the same channel, and different channels may be allocated to adjacent BSSs in order to prevent the collisions. When the different channels are allocated to the adjacent BSSs, the collisions between the adjacent BSSs may not be generated, and the adjacent BSSs may independently transmit and receive. For this, when establishing a new BSS, the access point has to establish its own channel in order not to overlap a channel of the adjacent BSSs. Further, when interference is generated by the new BSS set by an adjacent access point, the access point may have to change its own channel according to necessity.

The number of channels which can be used in the WLAN is limited, but the number of the access points is rapidly being increased. Accordingly, it may not be easy to allocate a channel so that the adjacent access points which use the channel do not overlap with each other. Actually, the channel may be overlapped between the adjacent access points, and in this case, a simultaneous transmission probability of the adjacent access points may be varied according to whether any channel is allocated to each adjacent access point, and is established as a primary channel. Specifically, when a narrow band is allocated so that the simultaneous transmission of the stations in the adjacent BSSs is possible, performance of the WLAN may be improved by the simultaneous transmission through the narrow band.

When an overlapping channel is used between the adjacent BSSs, resource utilization may be improved by allocating a resource so that transmission through the narrow band is performed within the same period. According to the IEEE 802.11 standard, the station may transmit a frame by connecting to a channel through competition in a distributed manner. In this environment, it may be impossible to schedule the resource so that the transmission through the narrow band is performed within the same period.

Hereinafter, a method of allocating a channel by considering an overlapping channel between adjacent BSSs will be described in detail.

Figure 3:
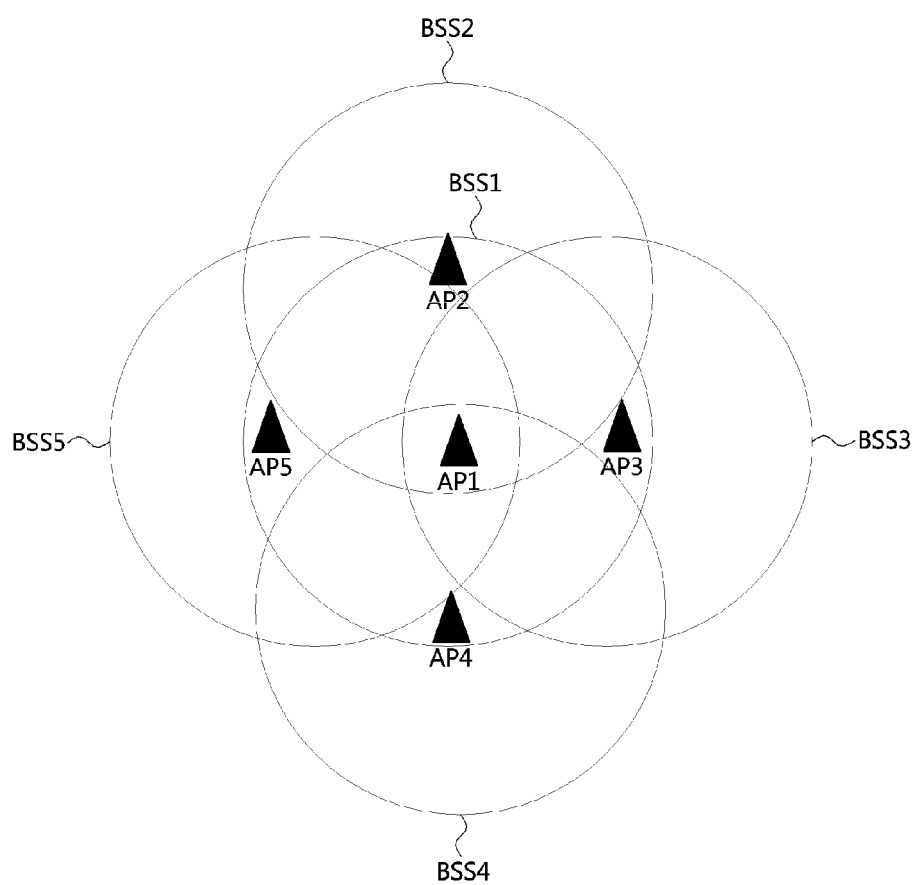
FIG. 3 is a schematic diagram illustrating an overlapping basic service set (OBSS) according to an embodiment of the inventive concept.

FIG. 3 is a schematic diagram illustrating an overlapping basic service set (OBSS) according to an embodiment of the inventive concept.

Referring to FIG. 3, a first access point AP1 may establish a BSS1, a second access point AP2 may establish a BSS2, a third access point AP3 may establish a BSS3, a fourth access point AP4 may establish a BSS4, and a fifth access point AP5 may establish a BSS5. When the access points AP1 to AP5 use the same channel, channel access competition and frame collision may be generated in an overlapping area of the access points AP1 to AP5. Accordingly, performance of the WLAN may be degraded.

The following methods may be used in order to alleviate the channel access competition and the frame collision.

A method of allocating a non-overlapping channel to BSSs

A method of performing coordination so that a transmission period of BSSs is not overlapped when allocating the same channel to the BSSs A method of performing coordination of an overlapping channel when the overlapping channel is generated due to the number of channels being insufficient even though non-overlapping channels are maximally allocated to the BSSs.

Method of Allocating a Non-Overlapping Channel to BSSs

Figure 4:
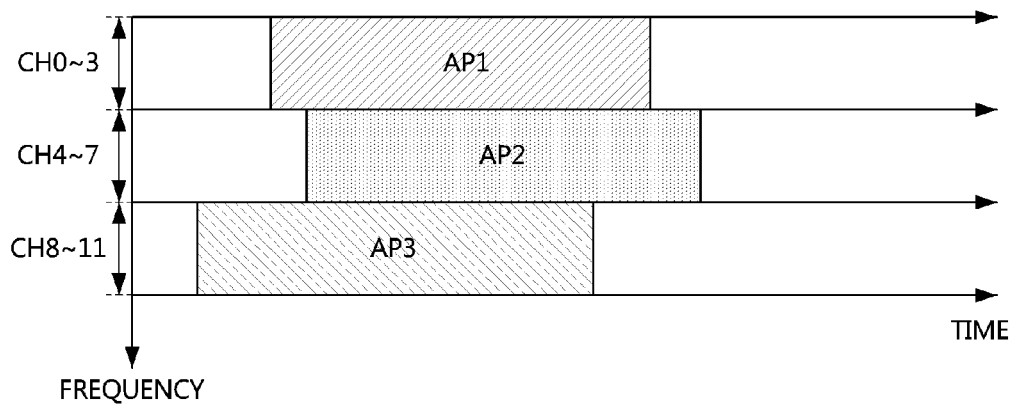
FIG. 4 is a schematic diagram for describing a method of allocating a non-overlapping channel to basic service sets (BSSs) according to an embodiment of the inventive concept.

FIG. 4 is a schematic diagram for describing a method of allocating a non-overlapping channel to basic service sets (BSSs) according to an embodiment of the inventive concept.

Referring to FIG. 4, a first access point AP1 which wants to establish a BSS1 may confirm that channels CH1 to CH11 are empty through a scanning operation. The first access point AP1 may establish the BSS1 to operate at the channels CH0 to CH3 among the empty channels CH1 to CH11. A second access point AP2 which wants to establish a BSS2 may confirm that the channels CH4 to CH11 are empty through the scanning operation. The second access point AP2 may establish the BSS2 to operate at the channels CH4 to CH7 among the empty channels CH4 to CH11. A third access point AP3 which wants to establish a BSS3 may confirm that the channels CH8 to CH11 are empty through the scanning operation. The third access point AP3 may establish the BSS3 to operate at the empty channels CH8 to CH11. Accordingly, each of the access points AP1, AP2, and AP3 may transmit and receive a frame without interference by another access point.

Meanwhile, a hidden access point may not be detected by the scanning operation. In this case, each of the access points AP1, AP2, and AP3 may not confirm whether there is the hidden access point, and establish the BSS. Each of the access points AP1, AP2, and AP3 may not be free from the interference by transmission and reception of the hidden access point. However, a terminal connected to each of the access points AP1, AP2, and AP3 may be located in the BSS established by the hidden access point. In this case, the terminal connected to each of the access points AP1, AP2, and AP3 may receive the interference by the transmission and reception of the hidden access point.

Method of Performing Coordination so that a Transmission Period of BSSs is not Overlapped when Allocating the Same Channel to the BSSs When the same channel is allocated to the BSSs since there are not many empty channels, it may be necessary to perform coordination on a transmission period of the BSSs in order to alleviate channel access competition and frame collisions between the BSSs. That is, when stations included in the BSSs transmit and receive a frame at different times, the channel access competition and the frame collisions may be alleviated.

Figure 5:
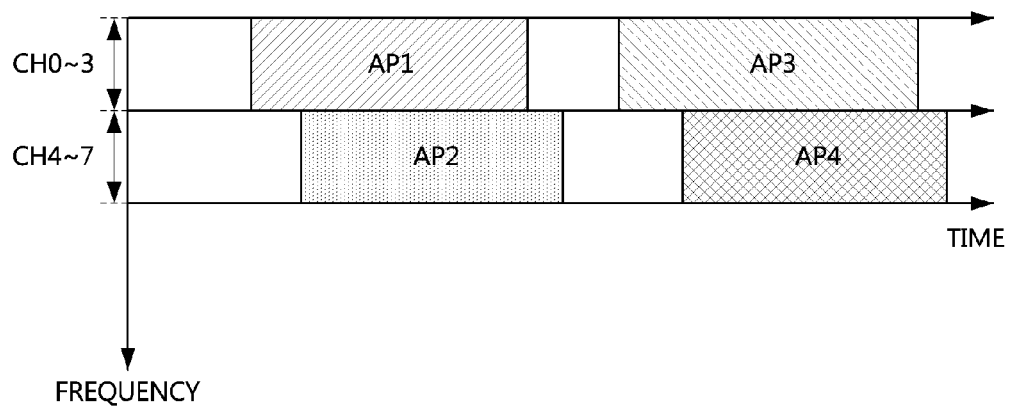
FIG. 5 is a schematic diagram for describing a method of performing coordination of a transmission period when the same channel is allocated to the BSSs according to an embodiment of the inventive concept.

FIG. 5 is a schematic diagram for describing a method of performing coordination on a transmission period when the same channel is allocated to the BSSs according to an embodiment of the inventive concept.

Referring to FIG. 5, a first access point AP1 which wants to establish a BSS1 may confirm that channels CH0 to CH7 are empty through the scanning operation. The first access point AP1 may establish the BSS1 to operate at the channels CH0 to CH3 among the empty channels CH0 to CH7. A second access point AP2 which wants to establish a BSS2 may confirm that the channels CH4 to CH7 are empty through the scanning operation. The second access point AP2 may establish the BSS2 to operate at the empty channels CH4 to CH7.

A third access point AP3 which wants to establish a BSS3 may recognize that every channel CH0 to CH7 is used by other access points AP1 and AP2 through the scanning operation. In this case, since there is no empty channel, the access point AP3 may establish the BSS3 to operate at channels (for example, CH0 to CH3) which are occupied by the other access points. A fourth access point AP4 which wants to establish a BSS4 may recognize that every channel CH0 to CH7 is used by other access points AP1, AP2, and AP3 through the scanning operation. In this case, since there is no empty channel, the access point AP4 may establish the BSS4 to operate at channels (for example, CH4 to CH7) which are occupied by the other access points.

At this time, transmission and reception of the station included in the BSS1 may receive interference from the station included in the BSS3, and conversely, transmission and reception of the station included in the BSS3 may receive interference from the station included in the BSS1. Further, transmission and reception of the station included in the BSS2 may receive interference from the station included in the BSS4, and conversely, transmission and reception of the station included in the BSS4 may receive interference from the station included in the BSS2.

In an environment described above, a master access point may set a transmission period of the first access point AP1 different from a transmission period of the third access point AP3 in the channels CH0 to CH3. Further, the master access point may set a transmission period of the second access point AP2 different from a transmission period of the fourth access point AP4 in the channels CH4 to CH7. Here, one among the access points AP1 to AP4 may operate as the master access point, or another access point besides the access points AP1 to AP4 may operate as the master access point.

Meanwhile, the access point having a coordination function may announce that the access point itself operates as the master access point through a beacon frame or a probe response frame. When the access point which wants to establish a new BSS finds the master access point, the access point may request optimum channel allocation considering operating channels of other BSSs from the master access point.

When the master access point allocates the same channel to the access points or allocates a channel so that a portion of channels excluding a primary channel are overlapped, the master access point may perform the coordination on the operating channel and the transmission period so as not to collide with another access point. The access point may allocate a resource to terminals included in its own BSS in the operating channel and within the transmission period allocated by the master access point, and transmit and receive a frame with the terminals through the allocated resource. The master access point may allocate the transmission period to each of the access points within a beacon interval.

When the access points are sufficiently far away from each other even when using the same channel, the access points may simultaneously transmit the frame. The master access point may acquire interference information with respect to an adjacent access point from each of the access points, and allocate the same transmission period to the access points which does not cause interference to each other based on the acquired interference information.

For this, the access point may transmit a frame request frame prescribed by the IEEE 802.11 to a terminal connected to the access point itself, and acquire the interference information with respect to the adjacent access point and the terminal connected to the adjacent access point by receiving a frame response frame which is a response to the frame request frame. Further, the access point may acquire the interference information with respect to the adjacent access point using the beacon request frame/beacon response frame instead of the frame request frame/frame response frame. The access point may transmit the acquired interference information to the master access point. The master access point may perform the coordination with respect to the operating channel and the transmission period based on the interference information acquired from the access point.

Further, the terminal may transmit the interference information with respect to at least one among the adjacent access point and the adjacent terminal to the access point connected to the terminal itself without exchanging the frame request frame/frame response frame (or, the beacon request frame/beacon response frame). The access point may transmit the acquired interference information to the master access point. The master access point may perform the coordination of the operation channel and the transmission period based on the interference information acquired from the access point.

When there is the master access point in the WLAN, the channel may be effectively used through the coordination with respect to the operating channel and the transmission period, but when there is no master access point in the WLAN, the channel may be wasted as described in the following.

Figure 6:
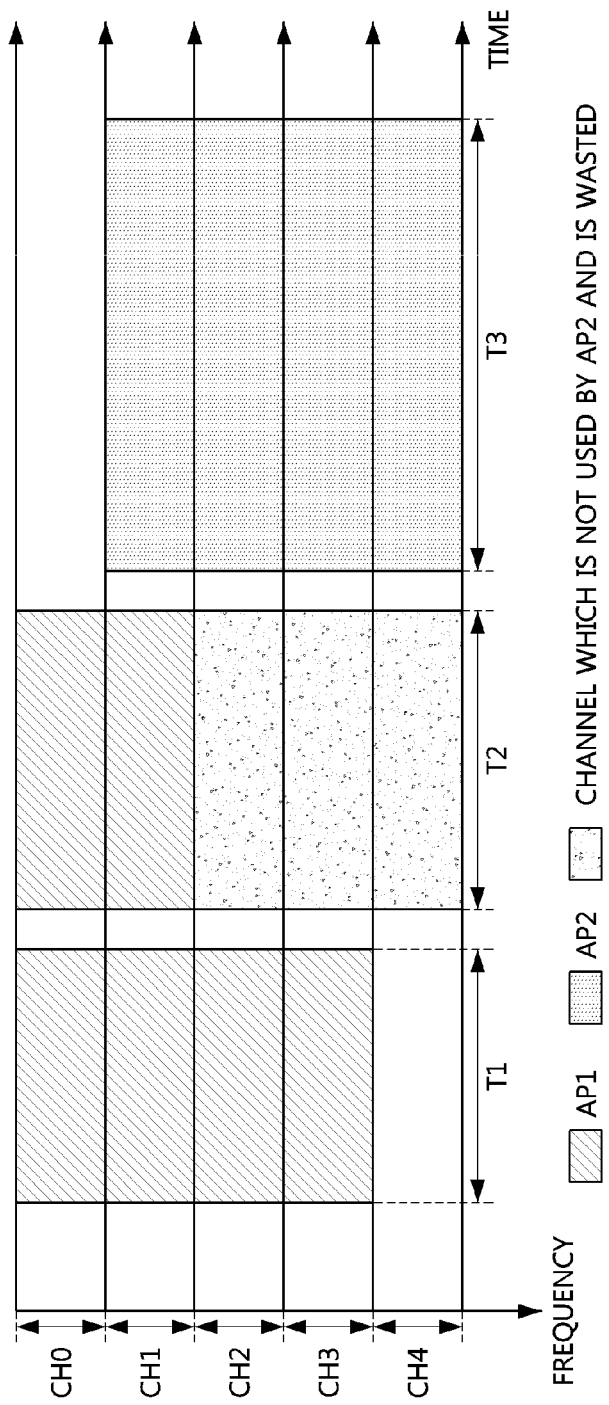
FIG. 6 is a schematic diagram for describing a channel wasted in a conventional wireless local area network (WLAN)

FIG. 6 is a schematic diagram for describing a channel wasted in a conventional wireless local area network (WLAN).

Referring to FIG. 6, a first access point AP1 may establish a BSS1 to operate at channels CH0 to CH3 (a total of 80 MHz), and set the channel CH0 as a primary channel. A second access point AP2 may establish a BSS2 so as to operate at channels CH1 to CH4 (a total of 80 MHz), and set the channel CH4 as the primary channel.

The first access point AP1 may transmit and receive a frame with terminals included in the BSS1 through the channels CH0 to CH3 during a period T1, and transmit and receive the frame with the terminals included in the BSS1 through the channels CH0 and CH1 during a period T2. Meanwhile, when the terminal included in the BSS2 which wants to transmit a frame using a bandwidth of 80 MHz during the period T2 is far away from the first access point AP1, the channels CH1 to CH4 on the terminal side may be in an idle state. In this case, a request to send (RTS) frame is transmitted using the bandwidth of 80 MHz, but the second access point AP2 may not transmit a clear to send (CTS) frame to the corresponding terminal since none of the channels CH1 to CH4 are in the idle state due to the transmission of the first access point AP1. That is, when the terminal included in the BSS2 supports a dynamic RTS/CTS prescribed by an IEEE 802.11ac standard, the second access point AP2 may transmit the CTS frame to the terminal having transmitted the RTS frame through the channels CH2 to CH4 during the period T2, but the second access point AP2 may not transmit the CTS frame to the terminal having transmitted the RTS frame during the period T2 when the terminal does not support the dynamic RTS/CTS. Accordingly, the channels CH2 to CH4 may be wasted during the period T2.

When the master access point allocates the channels CH0 and CH1 to the first access point AP1 and allocates the channels CH2 to CH4 to the second access point AP2 during the period T2 and the first access point AP1, the second access point AP2, and terminals connected to the BSS1 and the BSS2 are notified of the corresponding channel allocation information, the access points AP1 and AP2 may simultaneously transmit and receive the frame.

Figure 7:
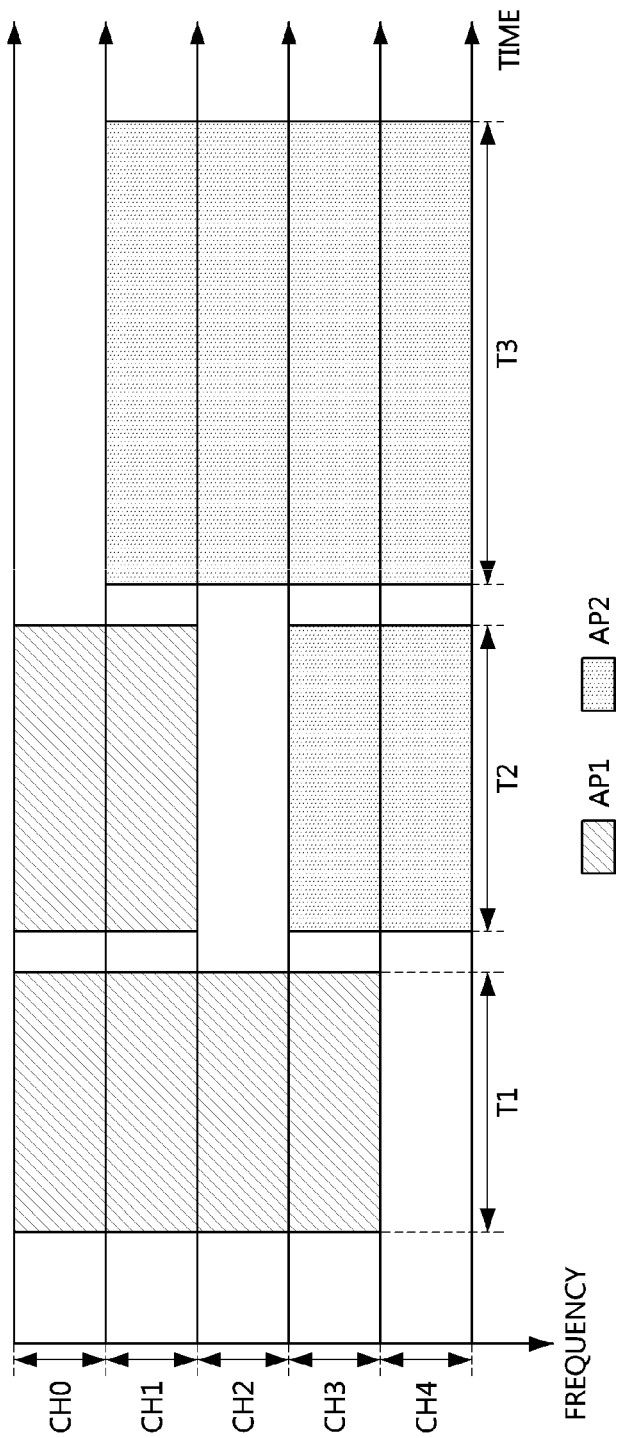
FIG. 7 is a schematic diagram for describing a method of performing coordination of an overlapping channel according to an embodiment of the inventive concept.

Method of Performing Coordination of an Overlapping Channel when the Overlapping Channel is Generated Due to the Number of Channels being Insufficient Even when Non-Overlapping Channels are Maximally Allocated to BSSs FIG. 7 is a schematic diagram for describing a method of performing coordination of an overlapping channel according to an embodiment of the inventive concept.

Referring to FIG. 7, a first access point AP1 which wants to establish a BSS1 may request channel allocation from a master access point. The master access point may allocate channels CH0 to CH3 (a total of 80 MHz) to the first access point AP1, and set the channel CH0 as a primary channel. A second access point AP2 which wants to establish a BSS2 may request channel allocation from the master access point. The master access point may allocate channels CH1 to CH4 (a total of 80 MHz) to the second access point AP2, and set the channel CH4 as the primary channel. Here, the primary channels of the access points AP1 and AP2 may be placed as far away as possible from each other. The channels CH1 to CH3 may be allocated to both of the first access point AP1 and the second access point AP2.

The master access point may perform the coordination with respect to the operating channel and the transmission period so that the first access point AP1 transmits and receives a frame through the channels CH0 to CH3 during a period T1. The master access point may perform the coordination with respect to the operating channel and the transmission period so that the first access point AP1 transmits and receives a frame through the channels CH0 and CH1 during a period T2 and the second access point AP2 transmits and receives the frame through the channels CH3 and CH4 during the period T2. In this case, the access points AP1 and AP2 may simultaneously transmit and receive the frame through a narrow band CH0 and CH1, and CH3 and CH4, respectively, during the same transmission period T2. The master access point may perform the coordination with respect to the operating channel and the transmission period so that the second access point AP2 transmits and receives the frame through the channels CH1 to CH4 during a period T3.

Figure 8:
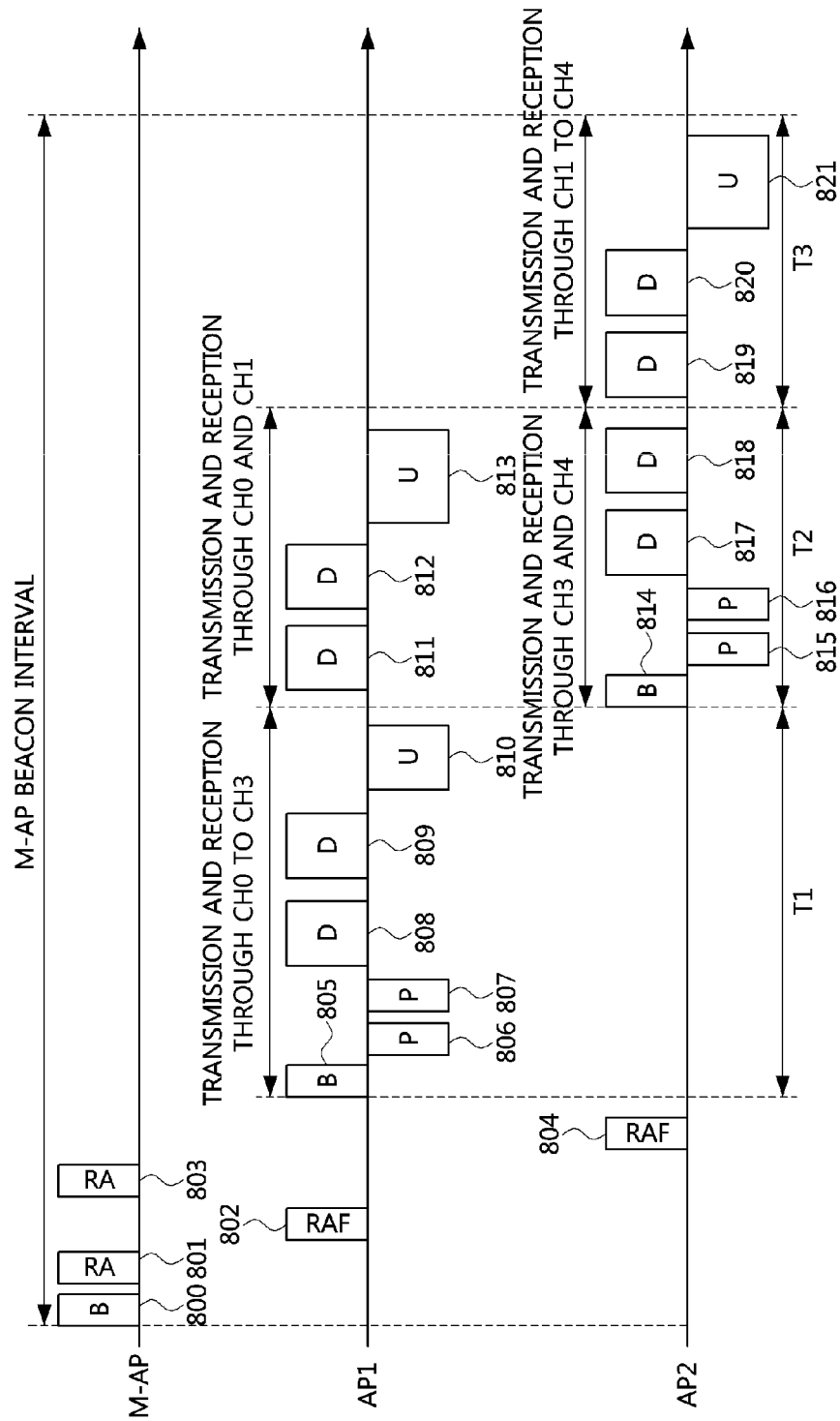
FIG. 8 is a schematic diagram for describing a method of allocating a channel according to one embodiment of the inventive concept.
Figure 9:
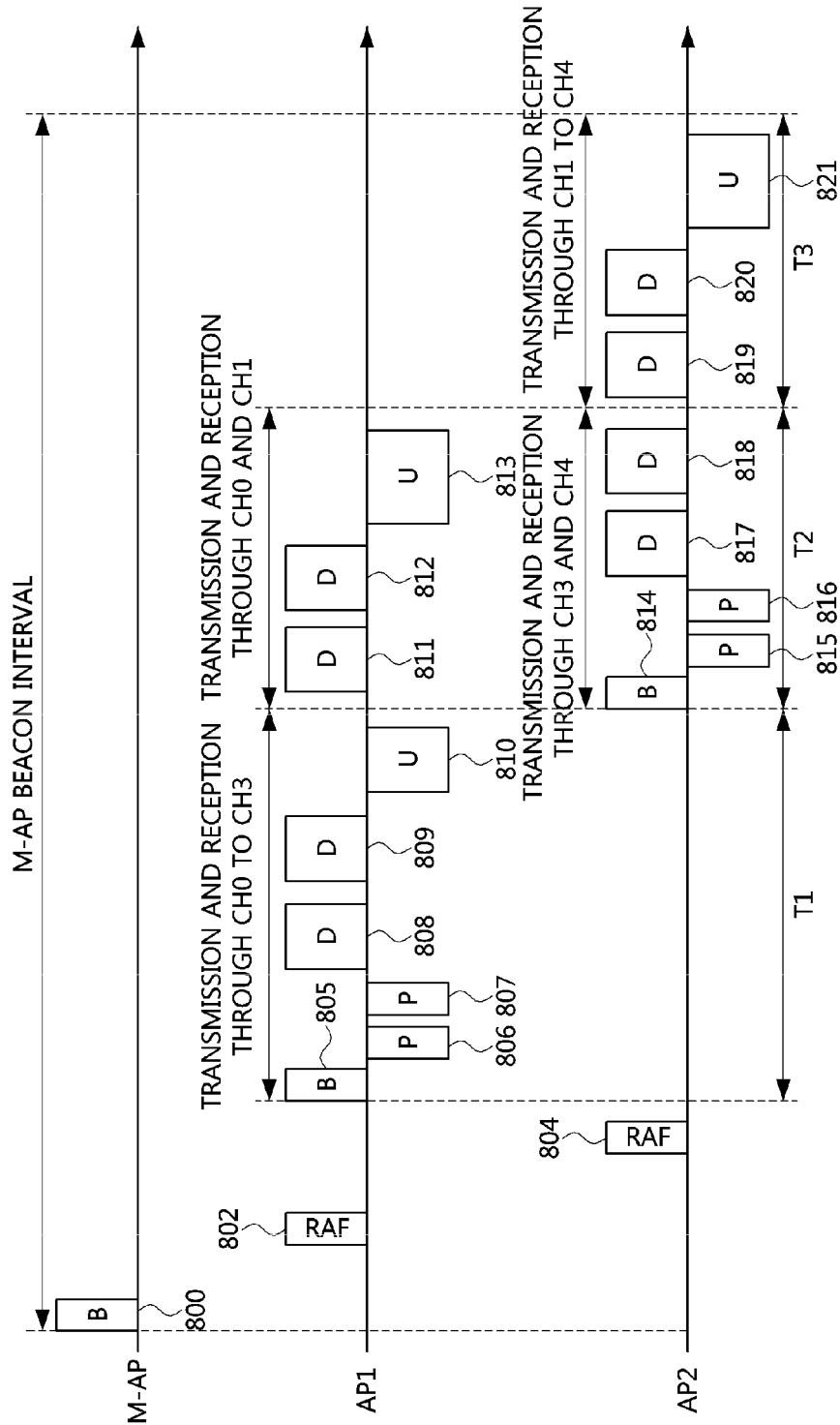
FIG. 9 is a schematic diagram for describing a method of allocating a channel according to another embodiment of the inventive concept.

FIG. 8 is a schematic diagram for describing a method of allocating a channel according to one embodiment of the inventive concept, and FIG. 9 is a schematic diagram for describing a method of allocating a channel according to another embodiment of the inventive concept.

Referring to FIGS. 8 and 9, a first access point AP1 which wants to establish a BSS1 may request channel allocation from a master access point M-AP. The master access point M-AP may allocate a channel to the first access point AP1 considering the operating channel of an adjacent access point. For example, the master access point M-AP may allocate channels CH0 to CH3 (that is, see FIG. 7) to the first access point AP1, and set the channel CH0 as a primary channel of the first access point AP1.

The second access point AP2 which wants to establish a BSS2 may request channel allocation from the master access point M-AP. The master access point M-AP may allocate a channel to the second access point AP2 considering the operating channel of an adjacent access point. For example, the master access point M-AP may allocate channels CH1 to CH4 (that is, see FIG. 7) to the second access point AP2, and set the channel CH4 as a primary channel of the second access point AP2.

Here, a primary channel of the master access point M-AP may be set differently from the primary channel of each of the access points AP1 and AP2. The master access point M-AP may support a broad band (for example, 160 MHz) so as to include the operating channels of the access points AP1 and AP2.

The master access point M-AP may perform the coordination of the operating channel and the transmission period of each of the access points AP1 and AP2 using the resource allocation frame or the beacon frame. The master access point M-AP may perform the coordination of the operating channel and the transmission period of each of the access points AP1 and AP2 in units of intervals of the resource allocation frame or the beacon frame. Here, the master access point M-AP may allocate the channels CH0 to CH3 to the first access point AP1 during the period T1, the channels CH0 and CH1 to the first access point AP1 during the period T2, the channels CH3 and CH4 to the second access point AP2 during the period T2, and the channels CH1 to CH4 to the second access point AP2 during the period T3.

Coordination Based on a Resource Allocation Frame

The master access point M-AP may periodically transmit the beacon frame 800 in a broadcast manner. The master access point M-AP may generate a resource allocation frame 801 for channel coordination with respect to the first access point AP1 after transmitting the beacon frame. A structure of a resource allocation element included in the resource allocation frame 801 is as described as follows.

FIG. 10 is a table for describing a resource allocation element according to an embodiment of the inventive concept.

Referring to FIG. 10, a resource allocation element may include an allocated resource field, an allocated interval field, and an allocated period field. The allocated resource field may include a starting time field, a duration field, and a bandwidth field. When one resource allocation element indicates a plurality of transmission periods, there may be a plurality of allocated resource fields in one resource allocation element. For example, when one resource allocation element indicates two different transmission periods, there may be two allocated resource fields in one resource allocation element.

The starting time field may have an 8-bit size, and indicate a duration from a transmission starting time of the resource allocation frame (or, the beacon frame) to a starting time of the allocated transmission period. The duration field may have a 14-bit size, and indicate a duration of the allocated transmission period. The bandwidth field may have a two-bit size, and indicate a bandwidth which is available during the allocated transmission period. That is, the bandwidth field may indicate a bandwidth which is available during the allocated transmission period.

The allocated interval field may have a 16-bit size, and indicate a transmission interval of the resource allocation frame (or, the beacon frame). The allocated period field may have an 8-bit size, and be represented as a multiple of the allocated interval field. The allocated period field may indicate a period to which information included in the allocated resource field of a corresponding resource allocation frame (or, the beacon frame) is applied. Accordingly, a new resource allocation frame (or, the beacon frame) may not be transmitted during a period which is indicated by the allocated period field.

Further, the resource allocation element may further include a beacon interval, a target beacon transmission time (TBTT), a time stamp, etc. of the master access point M-AP. Here, the beacon interval, the TBTT, the time stamp of the master access point M-AP may be used for synchronization with the master access point M-AP.

Referring to FIGS. 8 and 9, the resource allocation element of the resource allocation frame 801 may include two allocated resource fields. A first allocated resource field may include a starting time field indicating a duration from the transmission starting time of the resource allocation frame 801 to the starting time of the period T1, a duration field indicating a duration of the period T1, and a bandwidth field indicating the channels CH0 to CH3. A second allocated resource field may include a starting time field indicating a duration from the transmission starting time of the resource allocation frame 801 to the starting time of the period T2, a duration field indicating a duration of the period T2, and a bandwidth field indicating the channels CH0 and CH1. Further, the duration field included in the resource allocation frame 801 may indicate a duration from the transmission starting time of the resource allocation frame 801 to a transmission end time of a resource allocation feedback frame 802 in order to guarantee transmission of the resource allocation feedback frame 802.

The master access point M-AP may transmit the resource allocation frame 801 to the first access point AP1. At this time, the master access point M-AP may transmit the resource allocation frame 801 to the first access point AP1 through the channel CH0 which is the primary channel of the first access point AP1. The first access point AP1 may receive the resource allocation frame 801 from the master access point M-AP, and confirm that the channels CH0 to CH3 are available during the period T1 and the channels CH0 and CH1 are available during the period T2 based on the resource allocation element included in the received resource allocation frame 801. Further, the first access point AP1 may recognize the interval and the period of the resource allocation frame 801, and the beacon interval, the TBTT and the time stamp of the master access point M-AP, etc. based on the resource allocation element included in the resource allocation frame 801.

After this, the first access point AP1 may generate a resource allocation feedback frame 802. The resource allocation feedback frame 802 may be used for informing the master access point M-AP of resource information required for transmission and reception during the interval according to a subsequent resource allocation frame. A structure of the resource allocation feedback frame 802 is as follows.

FIG. 11 is a diagram illustrating a structure of a resource allocation feedback frame according to an embodiment of the inventive concept.

Referring to FIG. 11, a resource allocation feedback frame may include a frame control field 1100, a duration field 1101, a receiver address field 1102, a transmitter address field 1103, a feedback control field 1104, an estimated up link (UL) duration field 1105, an average UL data rate field 1106, an estimated down link (DL) duration field 1107, an average DL data rate field 1108, a 20 MHz failure ratio field 1109, a 40 MHz failure ratio field 1110, an 80 MHz failure ratio field 1111, a 160 MHz failure ratio field 1112, and a frame check sequence field 1113. Further, the resource allocation feedback frame may further include bandwidth information used during an interval according to a previous resource allocation frame (or, a previous beacon frame), and minimum bandwidth information required for transmission and reception during an interval according to a subsequent resource allocation frame (or, a subsequent beacon frame).

The feedback control field 1104 may include a bandwidth field 1104-1, a UL feedback indication field 1104-2, a DL feedback indication field 1104-3, a 20 MHz indication field 1104-4, a 40 MHz indication field 1104-5, an 80 MHz indication field 1104-6, and a 160 MHz indication field 1104-7.

The bandwidth field 1104-1 may have a two-bit size. The bandwidth field 1104-1 indicates a minimum bandwidth (20 MHz/40 MHz/80 MHz/160 MHz/etc.) required for a subsequent interval. The 20 MHz indication field 1104-4, the 40 MHz indication field 1104-4, the 80 MHz indication field 1104-4, and the 160 MHz indication field 1104-4 have a one-bit size, and indicate whether transmission has been performed during a previous transmission interval at 20 MHz, 40 MHz, 80 MHz, and 160 MHz, respectively. The bit that is set to 1 indicates that a previous transmission has been performed in the corresponding bandwidth, whereas the bit that is set to 0 indicates that the previous transmission has not been performed in the corresponding bandwidth.

The UL feedback indication field 1104-2 may have a one-bit size, and indicate whether there are the estimated UL duration field 1105 and the average UL data rate field 1106 in the resource allocation feedback frame. When the bit is 1, there are the estimated UL duration field 1105 and the average UL data rate field 1106 in the resource allocation feedback frame. On the other hand, when the bit is 0, there are none of the estimated UL duration field 1105 and the average UL data rate field 1106 in the resource allocation feedback frame.

The DL feedback indication field 1104-3 may have a one-bit size, and indicate whether there are the estimated DL duration field 1107 and the average DL data rate field 1108 in the resource allocation feedback frame. When the bit is 1, there are the estimated DL duration field 1107 and the average DL data rate field 1108 in the resource allocation feedback frame. On the other hand, when the bit is 0, there are none of the estimated DL duration field 1107 and the average DL data rate field 1108 in the resource allocation feedback frame.

When the 20 MHz indication field 1104-4 has a bit of 1, there is the 20 MHz failure ratio field 1109 in the resource allocation feedback frame. On the other hand, when the 20 MHz indication field 1104-4 has a bit of 0, there is not the 20 MHz failure ratio field 1109 in the resource allocation feedback frame. When the 40 MHz indication field 1104-5 has a bit of 1, there is the 40 MHz failure ratio field 1110 in the resource allocation feedback frame. On the other hand, when the 40 MHz indication field 1104-5 has a bit of 0, there is not the 40 MHz failure ratio field 1110 in the resource allocation feedback frame. When the 80 MHz indication field 1104-6 has a bit of 1, there is the 80 MHz failure ratio field 1111 in the resource allocation feedback frame. On the other hand, when the 80 MHz indication field 1104-6 has a bit of 0, there is not the 80 MHz failure ratio field 1111 in the resource allocation feedback frame. When the 160 MHz indication field 1104-7 has a bit of 1, there is the 160 MHz failure ratio field 1112 in the resource allocation feedback frame. On the other hand, when the 160 MHz indication field 1104-7 has a bit of 0, there is not the 160 MHz failure ratio field 1112 in the resource allocation feedback frame.

The estimated UL duration field 1105 may have a two-octet size, and indicate an estimated duration required for a UL transmission during an interval according to the subsequent resource allocation frame (or, the beacon frame). The estimated UL duration field required for the UL transmission may be calculated based on a data size to be transmitted during the interval according to the subsequent resource allocation frame (or, the beacon frame) and the average data rate of the UL transmission during the interval according to the previous resource allocation frame (or, the beacon frame). The average UL data rate field 1106 may have a two-octet size, and indicate the average data rate of the UL transmission during the interval according to the previous resource allocation frame (or, the beacon frame).

The estimated DL duration field 1107 may have a one-octet size, and indicate an estimated duration required for a DL transmission during the interval according to the subsequent resource allocation frame (or, the beacon frame). The estimated duration required for the DL transmission may be calculated based on a data size to be transmitted during the interval according to the subsequent resource allocation frame (or, the beacon frame) and the average data rate of the DL transmission during the interval according to the previous resource allocation frame (or, the beacon frame). The average DL data rate field 1108 may have a one-octet size, and indicate the average data rate of the DL transmission during the interval according to the previous resource allocation frame (or, the beacon frame).

The 20 MHz failure ratio field 1109 may have a one-octet size, and indicate a failure ratio of the transmission through a bandwidth of 20 MHz during the interval according to the previous resource allocation frame (or, the beacon frame). The 40 MHz failure ratio field 1110 may have a one-octet size, and indicate a failure ratio of the transmission through a bandwidth of 40 MHz during the interval according to the previous resource allocation frame (or, the beacon frame). The 80 MHz failure ratio field 1111 may have a one-octet size, and indicate a failure ratio of the transmission through a bandwidth of 80 MHz during the interval according to the previous resource allocation frame (or, the beacon frame). The 160 MHz failure ratio field 1112 may have a one-octet size, and indicate a failure ratio of the transmission through a bandwidth of 160 MHz during the interval according to the previous resource allocation frame (or, the beacon frame). Here, the failure ratio may be represented as (the number of times of transmission failures/the number of times of transmission attempts)×255.

Referring to FIGS. 8 and 9 again, the first access point AP1 may transmit the generated resource allocation feedback frame 802 to the master access point M-AP. Further, when the first access point AP1 receives an arbitrary poll frame from the master access point M-AP, the first access point AP1 may transmit the generated resource allocation feedback frame 802 to the master access point M-AP. At this time, the first access point AP1 may transmit the resource allocation feedback frame 802 to the master access point M-AP in the form of a non-high throughput (HT) duplicate through the channels CH0 to CH3 which are all of the operating channels thereof in order to guarantee the transmission of the resource allocation feedback frame 802.

The master access point M-AP may receive the resource allocation feedback frame 802 from the first access point AP1, and perform coordination of the interval according to the subsequent resource allocation frame based on the information included in the received resource allocation feedback frame 802. For example, the master access point M-AP may allocate a resource to the first access point AP1 considering the estimated duration required for the UL transmission, the estimated duration required for the DL transmission, the average data rate of the UL transmission, and the average data rate of the DL transmission included in the resource allocation feedback frame 802.

Further, the master access point M-AP may allocate a bandwidth having a relatively low transmission failure ratio to the first access point AP1 during the interval according to the subsequent resource allocation frame considering the transmission failure ratio according to a bandwidth. For example, when the transmission failure ratio of the bandwidth of 40 MHz is equal to or less than that of the bandwidth of 80 MHz during the interval according to the previous resource allocation frame, the master access point M-AP may allocate a bandwidth which is equal to or less than 40 MHz to the first access point AP1 during the interval according to the subsequent resource allocation frame.

When the reception of the resource allocation feedback frame 802 is completed, the master access point M-AP may generate a resource allocation frame 803 for coordination with respect to the operating channel and the transmission period of the second access point AP2. The resource allocation element included in the resource allocation frame 803 may be the same as the resource allocation element described above with reference to FIG. 10.

That is, the resource allocation element of the resource allocation frame 803 may include two allocated resource fields. A first allocated resource field may include a starting time field indicating a duration from the transmission starting time of the resource allocation frame 803 to the starting time of the period T2, a duration field indicating a duration of the period T2, and a bandwidth field indicating the channels CH3 and CH4. A second allocated resource field may include a starting time field indicating a duration from the transmission starting time of the resource allocation frame 803 to the starting time of the period T3, a duration field indicating a duration of the period T3, and a bandwidth field indicating the channels CH1 to CH4. Further, the duration field included in the resource allocation field 803 may indicate a duration from the transmission starting time of the resource allocation frame 803 to the transmission end time of a resource allocation feedback frame 804 in order to guarantee the transmission of the resource allocation feedback frame 804.

The master access point M-AP may transmit the resource allocation frame 803 to the second access point AP2. At this time, the master access point M-AP may transmit the resource allocation frame 803 to the second access point AP2 through the channel CH4 which is a primary channel of the second access point AP2. The second access point AP2 may receive the resource allocation frame 803, and confirm that the channels CH3 and CH4 are available during the period T2 and the channels CH1 to CH4 are available during the period T3 based on the resource allocation element included in the received resource allocation frame 803. Further, the second access point AP2 may recognize the interval and the period of the resource allocation frame 803, and the beacon interval, the TBTT, and the time stamp of the master access point M-AP, etc. based on the resource allocation element included in the resource allocation frame 803.

After this, the second access point AP2 may generate the resource allocation feedback frame 804. The resource allocation feedback frame 804 may be used for informing the master access point M-AP of resource information required during the interval according to the subsequent resource allocation frame. The resource allocation feedback frame 804 may be the same as the resource allocation feedback frame described above with reference to FIG. 11.

The second access point AP2 may transmit the generated resource allocation feedback frame 804 to the master access point M-AP. Further, when receiving an arbitrary poll frame from the master access point M-AP, the second access point AP2 may transmit the generated resource allocation feedback frame 804 to the master access point M-AP. At this time, the second access point AP2 may transmit the resource allocation feedback frame to the master access point M-AP in the form of a non-HT duplicate through the channels CH1 to CH4 which are all of the operating channels thereof in order to guarantee the transmission of the resource allocation feedback frame 804.

The master access point M-AP may receive the resource allocation feedback frame 804 from the second access point AP2, and perform the coordination of the interval according to the subsequent resource allocation frame based on information included in the received resource allocation feedback frame 804. For example, the master access point M-AP may allocate a resource to the second access point AP2 by considering the estimated duration required for the UL transmission, the estimated duration required for the DL transmission, the average data rate of the UL transmission, the average data rate of the DL transmission, etc. included in the resource allocation feedback frame 804.

Further, the master access point M-AP may allocate a bandwidth having a relatively low transmission failure ratio to the second access point AP2 during the interval according to the subsequent resource allocation frame considering a transmission failure ratio according to the bandwidth. For example, when the transmission failure ratio of a bandwidth which is equal to or lower than 40 MHz is lower than that of the 80 MHz bandwidth during the interval according to the previous resource allocation frame, the master access point M-AP may allocate a bandwidth which is equal to or less than the 40 MHz to the second access point AP2 during the interval according to the subsequent resource allocation frame.

Coordination Based on a Beacon Frame

The master access point M-AP may generate the beacon frame 800 including a first resource allocation element for channel coordination with respect to the operating channel and the transmission period of the first access point AN, and a second resource allocation element for channel coordination with respect to the operating channel and the transmission period of the second access point AP2. Each of the first and second resource allocation elements may be the same as the resource allocation element described above with reference to FIG. 10. Here, when the resource allocation element indicates a plurality of transmission periods, there may be a plurality of allocated resource fields in one resource allocation element.

The first resource allocation element may include two allocated resource fields. A first allocated resource field may include a starting time field indicating a duration from the transmission starting time of the beacon frame 800 to a starting time of the period T1, a duration field indicating a duration of the period T1, and a bandwidth field indicating the channels CH0 to CH3. A second allocated resource field may include a starting time field indicating a duration from the transmission starting time of the beacon frame 800 to a starting time of the period T2, a duration field indicating a duration of the period T2, and a bandwidth field indicating the channels CH0 and CH1. Further, the first resource allocation element may further include a basic service set identifier (BSSID) of the first access point AP1.

The second resource allocation element may include two allocated resource fields. A first allocated resource field may include a starting time field indicating a duration from the transmission starting time of the beacon frame 800 to a starting time of the period T2, a duration field indicating a duration of the period T2, and a bandwidth field indicating the channels CH3 and CH4. A second allocated resource field may include a starting time field indicating a duration from the transmission starting time of the beacon frame 800 to a starting time of the period T3, a duration field indicating a duration of the period T3, and a bandwidth field indicating the channels CH1 to CH4. Further, the second resource allocation element may further include a BSSID of the second access point AP2.

Meanwhile, the master access point M-AP may set a restricted access window (RAW) with respect to each of the resource allocation feedback frames 802 and 804 in order to guarantee the transmission of the resource allocation feedback frames 802 and 804, and generate the beacon frame 800 including the set RAW information. Further, the master access point M-AP may guarantee the transmission of the resource allocation feedback frames 802 and 804 using the duration field of the beacon frame 800. That is, the duration field of the beacon frame 800 may indicate a duration from the transmission starting time of the beacon frame 800 to the transmission end time of the resource allocation feedback frames 802 and 804 in order to guarantee the transmission of the resource allocation feedback frames 802 and 804.

The master access point M-AP may transmit the beacon frame 800 in a broadcast manner. At this time, the master access point M-AP may transmit the beacon frame 800 in the form of a non-HT duplicate through the channels CH0 to CH4 which are all the operating channels of the master access point M-AP.

The first access point AP1 may receive the beacon frame 800 from the master access point M-AP, and confirm that the channels CH0 to CH3 are available during the period T1 and the channels CH0 and CH1 are available during the period T2 based on the first resource allocation element included in the beacon frame 800. After this, the first access point AP1 may generate the resource allocation feedback frame 802. The resource allocation feedback frame 802 may be used for informing the master access point M-AP of the resource information required during the interval according to the subsequent resource allocation frame. The resource allocation feedback frame 802 may be the same as the resource allocation feedback frame described above with reference to FIG. 11.

The first access point AP1 may transmit the generated resource allocation feedback frame 802 to the master access point M-AP. Further, the first access point AP1 may transmit the generated resource allocation feedback frame 802 to the master access point M-AP when receiving an arbitrary poll frame from the master access point M-AP. At this time, the first access point AP1 may transmit the resource allocation feedback frame 802 to the master access point M-AP in the form of a non-HT duplicate through the channels CH0 to CH3 which are all of the operating channels thereof in order to guarantee the transmission of the resource allocation feedback frame 802.

The master access point M-AP may receive the resource allocation feedback frame 802 from the first access point AP1, and perform the coordination of the interval according to the subsequent beacon frame based on the information included in the received resource allocation feedback frame 802.

Meanwhile, the second access point AP2 may receive the beacon frame 800 from the master access point M-AP, and confirm that the channels CH3 and CH4 are available during the period T2 and the channels CH1 to CH4 are available during the period T3 based on the second resource allocation element included in the beacon frame 800. After this, the second access point AP2 may generate the resource allocation feedback frame 804. The resource allocation feedback frame 804 may be used for informing the master access point M-AP of the resource information required during the interval according to the subsequent resource allocation frame. The resource allocation feedback frame 804 may be the same as the resource allocation feedback frame described above with reference to FIG. 11.

The second access point AP2 may transmit the generated resource allocation feedback frame 804 to the master access point M-AP. Further, the second access point AP2 may transmit the generated resource allocation feedback frame 804 to the master access point M-AP when receiving an arbitrary poll frame from the master access point M-AP. At this time, the second access point AP2 may transmit the resource allocation feedback frame 804 to the master access point M-AP in the form of a non-HT duplicate through the channels CH1 to CH4 which are all of the operating channels thereof in order to guarantee the transmission of the resource allocation feedback frame 804.

The master access point M-AP may receive the resource allocation feedback frame 804 from the second access point AP2, and perform the coordination of the interval according to the subsequent beacon frame based on the information included in the received resource allocation feedback frame 804.

Meanwhile, when the master access point M-AP and the access points AP1 and AP2 have a hidden access point relationship, the resource allocation element and the resource allocation feedback frame may be transmitted and received through a wire.

Subsequently, a frame transmission and reception operation of each of the access points AP1 and AP2 will be described. Since the frame transmission and reception operation are the same in both a coordination manner based on the resource allocation frame and a coordination manner based on the beacon frame, the operation will be integrally described.

The first access point AP1 may transmit and receive a frame with the terminals included in the BSS1 using the channels CH0 to CH4 during the period T1. That is, the first access point AP1 may announce that data for at least one terminal included in the BSS1 is buffered by transmitting a beacon frame 805. Further, the beacon frame 805 may include DL RAW information for the transmission of DL data frames 808, 809, 811, and 812, and UL RAW information for the transmission of UL data frames 810 and 813. That is, the transmission and reception of the DL data frames 808, 809, 811, and 812 may be performed in the DL RAW, and the transmission and reception of the UL data frames 810 and 813 may be performed in the UL RAW.

The first access point AP1 may receive power save (PS)-poll frames 806 and 807 from the terminals included in the BSS1, and transmit the DL data frames 808 and 809 after confirming that the terminals are active through the PS-poll frames 806 and 807. Further, the first access point AP1 may receive the UL data frame 810 from the terminals included in the BSS1. After this, the first access point AP1 may transmit and receive a frame with the terminals included in the BSS1 using the channels CH0 and CH1 during the period T2. That is, the first access point AP1 may transmit the DL data frames 811 and 812 to the terminals included in the BSS1, and receive the UL frame 813 from the terminals included in the BSS1.

Meanwhile, the second access point AP2 may transmit and receive the frame with the terminals included in the BSS2 using the channels CH3 and CH4 during the period T2. That is, the second access point AP2 may announce that data for at least one terminal included in the BSS2 is buffered by transmitting a beacon frame 814. Further, the beacon frame 814 may include DL RAW information for the transmission of DL data frames 817, 818, 819, and 820, and UL RAW information for the transmission of a UL data frame 821. That is, the transmission and reception of the DL data frames 817, 818, 819, and 820 may be performed in the DL RAW, and the transmission and reception of the UL data frame 821 may be performed in the UL RAW.

The second access point AP2 may receive PS-poll frames 815 and 816 from the terminals included in the BSS2, and transmit the DL data frames 817 and 818 after confirming that the terminals are active through the PS-poll frames 815 and 816. That is, the second access point AP2 may perform a simultaneous transmission with the first access point AP1 through a narrow band during the period T2.

After this, the second access point AP2 may transmit and receive a frame with the terminals included in the BSS2 using the channels CH1 to CH4 during the period T3. That is, the second access point AP2 may transmit the DL data frames 819 and 820 to the terminals included in the BSS2, and receive the UL frame 821 from the terminals included in the BSS2.

According to the inventive concept, the performance of the WLAN can be improved.

Exemplary embodiments of the inventive concept may be recorded in a computer-readable record medium by being implemented in the form of program instructions which are executable using various computer components. The computer-readable record medium may include program instructions, data files, data structures, etc., alone or in combination. The program instructions recorded in the computer-readable record medium may be specially designed for the inventive concept, or may be known to those skilled in the art of the computer software field.

Examples of the computer-readable record medium may include a hardware device, which is specially configured to store and execute the program instructions, such as a floptical disk, a read only memory (ROM), a random access memory (RAM), a flash memory, etc. The hardware device may be configured to operate as one or more software modules to perform the method according to exemplary embodiments of the inventive concept, and vice versa. Examples of the program instructions may include mechanical codes which are made by a compiler, and high-level language codes which are executable by a computer using an interpreter, etc.

While the example embodiments of the inventive concept and their advantages have been described in detail, it should be understood that various changes, substitutions, and alterations may be made herein without departing from the scope of the invention.

What is claimed is:

1. A method of setting a channel performed at a first access point, the method comprising:
   receiving a first frame including scheduling information with respect to an interval #n from a second access point supporting a plurality of channels;
   generating a second frame including resource related information required for transmission and reception during an interval #(n+1) which is continuous to the interval #n;
   transmitting the second frame to the second access point,
   wherein, when the interval #n is allocated for the first access point and a third access point, the scheduling information indicates at least one channel except for channels allocated to the third access point among the plurality of channels, and communications between the first access point and at least one terminal which is accessed to the first access point are performed using the at least one channel indicated by the scheduling information in the interval #n, and
   wherein the resource related information indicates necessary resources for communications of the first access point in the interval #(n+1), and n is an integer of one or more.

2. The method of setting the channel of claim 1, wherein the first frame is a beacon frame.

3. The method of setting the channel of claim 1, wherein the first frame includes duration information from a transmission starting time of the first frame to a transmission end time of the second frame.

4. The method of setting the channel of claim 1, wherein the first frame includes restricted access window information indicating a transmission period of the second frame.

5. The method of setting the channel of claim 1, wherein the first frame is received at a starting time of the interval #n.

6. The method of setting the channel of claim 1, wherein the scheduling information includes at least one of an operating channel and a transmission period of the first access point during the interval #n.

7. The method of setting the channel of claim 1, wherein the resource related information includes at least one of estimated duration information required for transmission and reception of a frame during the interval #(n+1), and a data rate and a transmission failure ratio of each of the bandwidths during an interval #(n−1) prior to the interval #n.

8. The method of setting the channel of claim 1, wherein the transmitting of the second frame to the second access point comprises:
   transmitting the second frame to the second access point when a poll frame is received from the second access point.

9. A method of managing a channel performed at a second access point supporting a plurality of channels, the method of managing the channel comprising:
   generating a first frame including scheduling information with respect to an interval #n;
   transmitting the first frame to a first access point; and
   receiving a second frame including resource related information required for transmission and reception through an interval #(n+1) which is continuous to the interval #n from the first access point,
   wherein, when the interval #n is allocated for the first access point and a third access point, the scheduling information indicates at least one channel except for channels allocated to the third access point among the plurality of channels, and communications between the first access point and at least one terminal which is accessed to the first access point are performed using the at least one channel indicated by the scheduling information in the interval #n, and
   wherein the resource related information indicates necessary resources for communications of the first access point in the interval #(n+1), and n is an integer of one or more.

10. The method of managing the channel of claim 9, wherein the first frame is a resource allocation frame.

11. The method of managing the channel of claim 9, wherein the first frame is transmitted to the first access point after a beacon frame of the second access point is transmitted.

12. The method of managing the channel of claim 9, wherein the scheduling information includes at least one of an operating channel and a transmission period of the first access point during the interval #n.

13. The method of managing the channel of claim 9, wherein the resource related information includes at least one of estimated duration information required for transmission and reception of a frame through the interval #(n+1), and a data rate and a transmission failure ratio of each of the bandwidths during an interval #(n−1) prior to the interval #n.

14. The method of managing the channel of claim 9, further comprising:
   generating scheduling information with respect to the interval #(n+1) based on the resource related information.

15. A first access point, comprising:
   a processor; and
   a memory configured to store at least one command which is executed through the processor,
   wherein the at least one command enables the processor to execute an operation comprising:
     receiving a first frame including scheduling information with respect to an interval #n from a second access point supporting a plurality of channels;
     generating a second frame including resource related information required for transmission and reception through an interval #(n+1) which is continuous to the interval #n; and
     transmitting the second frame to the second access point,
   wherein, when the interval #n is allocated for the first access point and a third access point, the scheduling information indicates at least one channel except for channels allocated to the third access point among the plurality of channels, and communications between the first access point and at least one terminal which is accessed to the first access point are performed using the at least one channel indicated by the scheduling information in the interval #n, and
   wherein the resource related information indicates necessary resources for communications of the first access point in the interval #(n+1), and n is an integer of one or more.

16. The first access point of claim 15, wherein the scheduling information includes at least one of an operation channel and a transmission period of the first access point during the interval #n.

17. The first access point of claim 15, wherein the resource related information includes at least one of estimated duration information required for transmission and reception of a frame through the interval #(n+1), and a data rate and a transmission failure ratio of each of the bandwidths during an interval #(n−1) prior to the interval #n.

18. The first access point of claim 15, wherein the transmitting of the second frame to the second access point comprises:
   transmitting the second frame to the second access point when a resource allocation frame is received from the second access point.

* * * * *